United States Patent
Melin et al.

(10) Patent No.: US 9,851,183 B2
(45) Date of Patent: Dec. 26, 2017

(54) CASSETTE ARRANGED FOR ACCOMMODATING A PAY LOAD OF PYROPHORIC MATERIAL

(75) Inventors: Robert Melin, Sollentuna (SE); Martin Ringstedt, Bromma (SE); Gunnar Byström, Kungsängen (SE)

(73) Assignee: SAAB AB, Linköping (SE)

( * ) Notice: Subject to any disclaimer, the term of this patent is extended or adjusted under 35 U.S.C. 154(b) by 1028 days.

(21) Appl. No.: 13/144,937

(22) PCT Filed: Jan. 16, 2009

(86) PCT No.: PCT/SE2009/050039
§ 371 (c)(1),
(2), (4) Date: Sep. 29, 2011

(87) PCT Pub. No.: WO2010/082880
PCT Pub. Date: Jul. 22, 2010

(65) Prior Publication Data
US 2012/0012605 A1      Jan. 19, 2012

(51) Int. Cl.
*F41H 11/02*      (2006.01)
*B64D 1/02*       (2006.01)
*F42B 12/70*      (2006.01)

(52) U.S. Cl.
CPC .............. *F41H 11/02* (2013.01); *B64D 1/02* (2013.01); *F42B 12/70* (2013.01)

(58) Field of Classification Search
CPC ...................................................... F42B 12/70
USPC ................. 221/154, 282, 186, 198; 206/509
See application file for complete search history.

(56) References Cited

U.S. PATENT DOCUMENTS

| | | | |
|---|---|---|---|
| 2,654,948 A | | 10/1960 | Johnson |
| 2,954,948 A | * | 10/1960 | Johnson ........................ 244/136 |
| 4,134,115 A | * | 1/1979 | Strom .............................. 342/12 |
| 4,650,092 A | | 3/1987 | Andersson et al. |
| 4,905,836 A | * | 3/1990 | Lindgren et al. ............. 206/557 |
| 5,221,018 A | * | 6/1993 | Pettersson et al. .......... 220/23.4 |
| 5,271,523 A | * | 12/1993 | Nasvall et al. ............... 221/185 |
| 5,544,751 A | * | 8/1996 | Klodt et al. .................. 206/509 |
| 5,663,518 A | * | 9/1997 | Widmer ......................... 89/1.11 |

(Continued)

FOREIGN PATENT DOCUMENTS

| | | |
|---|---|---|
| EP | 0055139 A1 | 6/1982 |
| GB | 1510813 A | 5/1978 |
| SE | 517872 C2 | 7/2002 |

OTHER PUBLICATIONS

PCT/IS/210—International Search Report—dated Sep. 23, 2009.

(Continued)

*Primary Examiner* — Patrick H Mackey
(74) *Attorney, Agent, or Firm* — Venable LLP

(57) ABSTRACT

A cassette designed for accommodating a payload. The cassette is exposed to an air flow when dispensed from a vehicle in motion. The cassette includes a base portion and a peripheral supporting portion connected to each other. The base portion and the peripheral supporting portion form a space for the accommodation of the payload. An opening is arranged in the cassette opposite the base portion. Through the opening the pay load can exit. The base portion includes at least one orifice through which the air flow will flow pressing against and separating the payload from the cassette when dispensed from the vehicle.

6 Claims, 3 Drawing Sheets

(56) References Cited

U.S. PATENT DOCUMENTS

| | | | |
|---|---|---|---|
| 6,539,833 B1 | 4/2003 | Zatterqvist | |
| 6,666,351 B1* | 12/2003 | Hartz et al. | 221/258 |
| 8,033,225 B2* | 10/2011 | Friede et al. | 102/505 |
| 2009/0120955 A1* | 5/2009 | Friede et al. | 221/282 |
| 2012/0012608 A1* | 1/2012 | Sjobeck et al. | 221/246 |
| 2012/0055949 A1* | 3/2012 | Stenfelt et al. | 221/1 |
| 2012/0104174 A1* | 5/2012 | Zatterqvist | 244/137.1 |

OTHER PUBLICATIONS

PCT/ISA/237—Written Opinion of the International Searching Authority—dated Sep. 23, 2009.
PCT/IPEA/409—International Preliminary Report on Patentability—dated May 11, 2011.
Extended European Search Report—dated Dec. 13, 2013 (Issued in Counterpart Application No. 09838486.0).

* cited by examiner

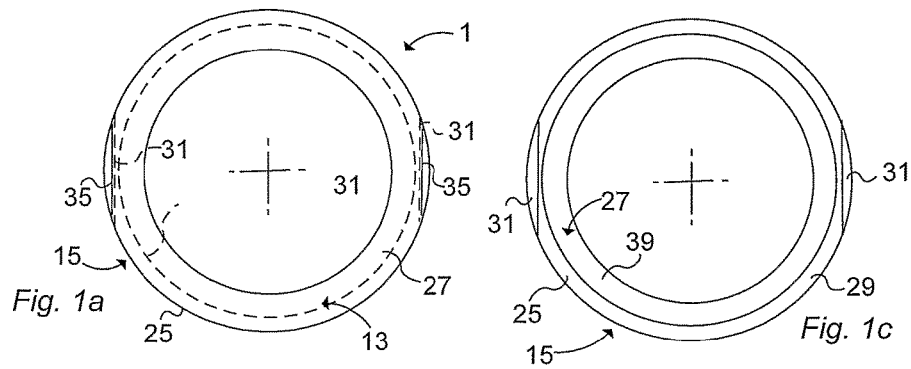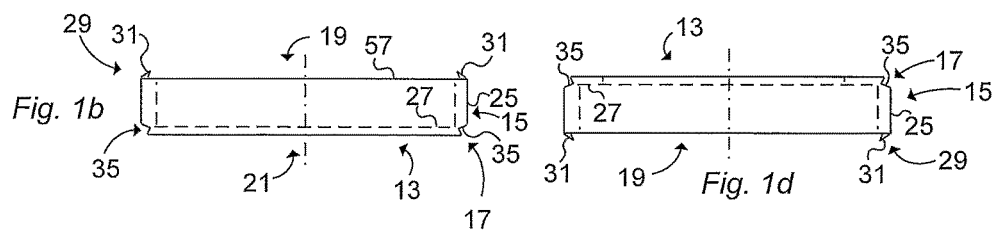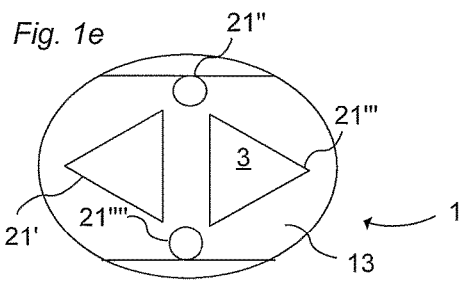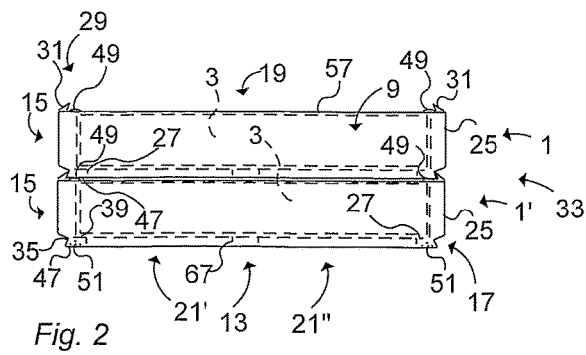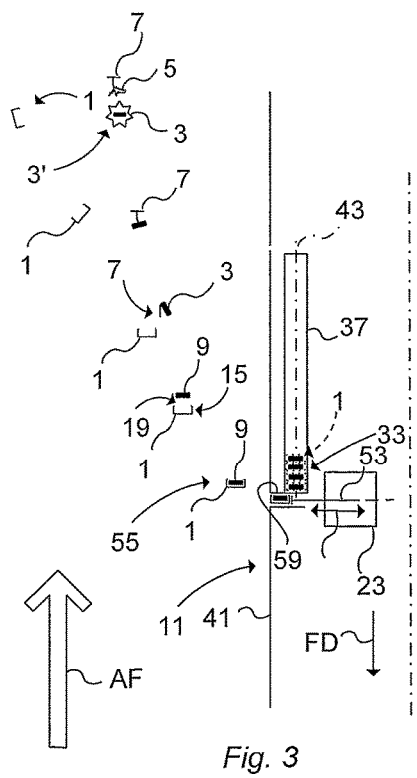

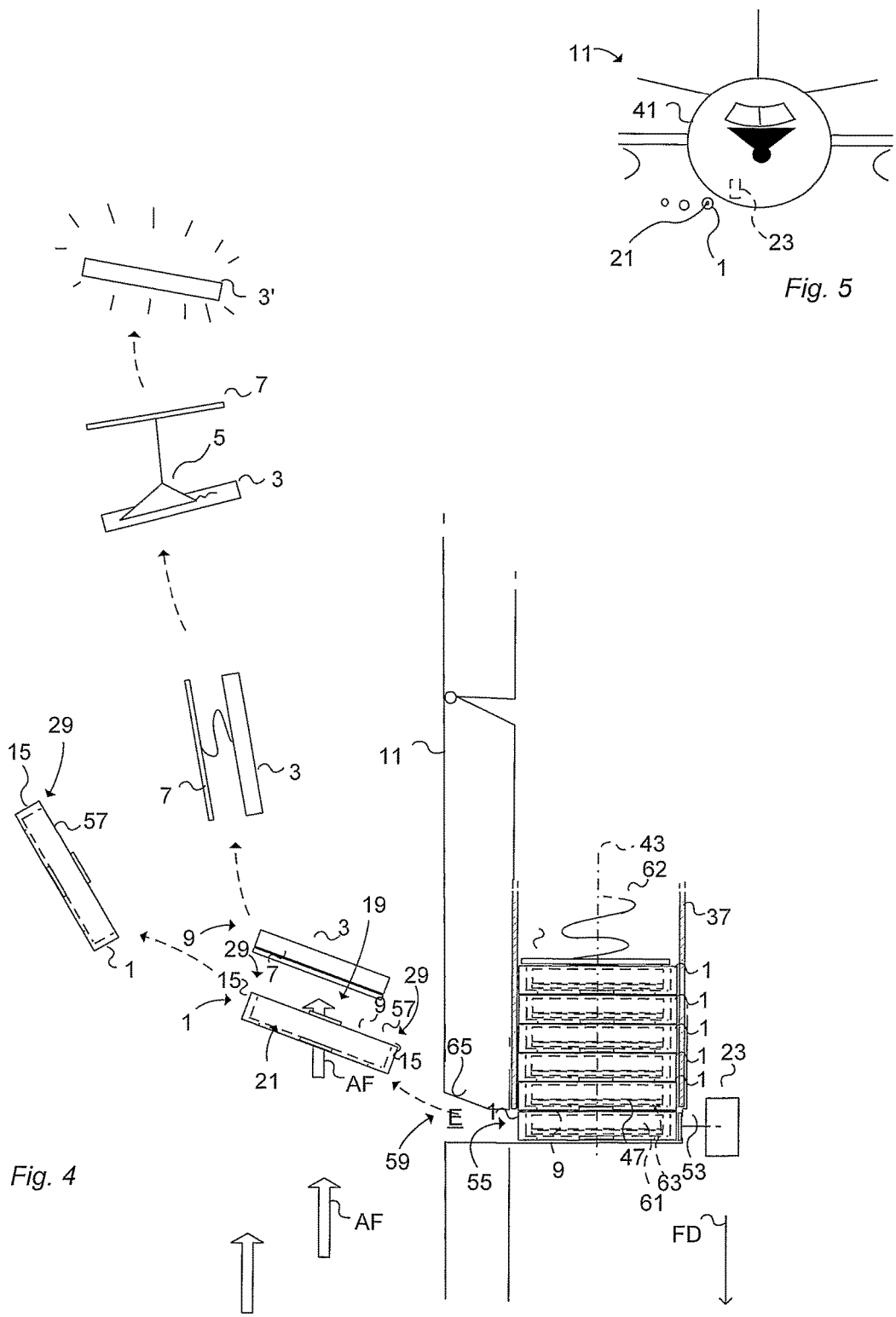

CASSETTE ARRANGED FOR ACCOMMODATING A PAY LOAD OF PYROPHORIC MATERIAL

CROSS-REFERENCE TO RELATED APPLICATIONS

This application is the national phase under 35 U.S.C. §371 of PCT/SE2009/050039 filed 16 Jan. 2009.

TECHNICAL FIELD

The present invention relates to a cassette for accommodating a pay load of an insert.

BACKGROUND ART

Today there exist several devices for ejection of pay loads from aircrafts. The ejection of pay loads is employed by the aircraft's defence system for disturbing radar, infra-red, laser controlled incoming weapons etc. A pay load can be a so called chaff. Also other types of pyrophoric material is used as a pay load in this matter.

The ejected pay loads (being comprised in so called decoys or countermeasure means before their activation) will be orientated relatively the aircraft's flying direction in such manner that they are dispensed essentially perpendicular to said direction, wherein the largest surface of each decoy faces the air flow when leaving the aircraft.

U.S. Pat. No. 4,650,092 and U.S. Pat. No. 6,666,351 discloses known devices for ejection of chaffs. The document SE 517 872 also discloses devices for the dispensing of chaffs.

Today, civil aircrafts do not have a capability of defending themselves against outside threats. This is due to for example that there is no affordable and durable countermeasure technology available for commercial use. One of the most feared risks is the Manpad (Man-Portable Air Defence) threat of IR-guided missiles, especially near airports, where aircraft fly low above areas that are practically impossible to secure against portable short-range missiles.

There are countermeasure technologies available for military aircrafts, for example a pyrophoric IR decoy dispenser system. However a civil aircraft platform requires a large scale market and secure handling of the decoys. The pyrophoric material inside one type of decoy package is called CAD, Combustible Area Decoy, and it burns when subjected to oxygen. Thus, the package or envelope must be an oxygen barrier and is not allowed to break when accidentally dropped near combustible materials.

The object of the invention is to develop a cassette which safely protects and dispenses its accommodated pay load. One further object with the present invention is to provide an effective dispensing system for the package, in which the package is opened and dispensed in a reliable way.

It is desirable that the pay load rapidly leaves the cassette when dispensed from the vehicle.

The object of the present invention is to overcome prior art drawbacks and to develop known cassettes for accommodating pay loads, which promptly will separate from the cassette after they have left the air craft's dispensing outlet.

SUMMARY OF THE INVENTION

This has been solved by a cassette being initially defined in the introduction.

In this way the pay load (being comprised in a so called insert) easily and promptly will leave the cassette after the discharge of the cassette from a dispenser unit of the vehicle, such as an aircraft. The pay load is fully encompassed by the cassette, wherein the peripheral supporting portion is comprised of a circular side wall extending perpendicular from the base portion such that it at least covers the thickness of the pay load. The base portion is exposed to the air flow initially during the discharge as the cassette, wherein the opening of the other side of the cassette is not exposed to the air flow. This is achieved by that the cassettes are dispensed from the air craft essentially perpendicular to the air flow direction with their base portions directed in the flying direction.

Preferably, the peripheral supporting portion comprises a first coupling member arranged adjacent the opening, and the base portion comprises a second coupling member, which coupling members are arranged for releasable attachment to a subsequent coupled identical cassette and/or in front coupled identical cassette, for forming a stack of cassettes.

Thereby a set of cassettes can be hold together in a stack, which stack can be loaded in a magazine connectable to the dispenser unit. The magazine is in itself releasable coupled to the dispenser unit of the aircraft, such that easy mounting/replacement of a loaded magazine can be achieved. The stack provides for an easy loading of the magazine.

Suitably the first and second coupling members are designed as snap holders being formed as hooks having a straight extension parallel with the plane of the base portion so that the cassette during the discharge is fed perpendicular to longitudinal direction of the stack.

In such a way the cassette will leave the stack after the discharge from the aircraft with no spinning which is beneficially for a simple and quick separation of the pay load and the cassette. This will also promote the possibility to arrange the magazine within the fuselage of the air craft wherein the longitudinal axis of the inserted stack is essentially parallel with the extension of the fuselage (still achieving that the chaffs can be dispensed perpendicular to the flying direction without any spinning) which means a not bulky arrangement of the magazine within the aircraft's shell.

Preferably at least a projection is arranged onto a first axial surface of the cassette adjacent the first coupling member, which projection co-operates with a second axial surface of a subsequent coupled identical cassette and/or in front coupled identical cassette, achieving that a predetermined contact force must be overcome for disengaging the cassettes from each other.

Thereby the cassette/cassettes being prevented from unintentionally leaving the stack due to vibrations. The cassette will thereby not migrate from the magazine and the dispenser unit by mistake.

Suitably, the peripheral supporting portion of the cassette comprises an outer surface, around which asymmetric disposed first fitting means are arranged such that the cassette only can be mounted in one way in a magazine comprising corresponding second fitting means.

Thereby the cassettes forming a stack only can be mounted in the magazine in one way, wherein the at least one orifice of each cassette will be directed towards the air flow when leaving the air craft. This will promote that the pay load quick and easy will leave the cassette after the discharge of the cassette from the dispenser unit.

Preferably, the peripheral supporting portion comprises a sliding surface arranged adjacent the opening, which sliding surface is parallel with the extension of the pay load.

The dispenser unit being permanently mounted in the air craft, comprises a chute arranged for feeding the decoys from the magazine to the exterior of the air craft, i.e to the air flow. Each decoy includes a cassette comprising the insert, wherein each insert comprises said pay load enveloped in an envelope being connected to a parachute. The insert has a front side, being adjacent with the base portion of the cassette and being exposed to the airflow when being separated from the cassette. A rear side of the insert is opposite the front side. The chute of the dispenser unit is oriented essentially perpendicular to the axial extension of the magazine and the stack. The direction of travel of the vehicle essentially coincides with the axial direction of the magazine, wherein the decoys will be fed in the chute in a direction essentially transverse the direction of travel. Since the insert, being encompassed in the cassette, has to be separated from the cassette through the opening, the opening is directed towards the chute surface and in a direction opposite the direction of travel. The rear side of the insert faces the chute surface during the travel from the magazine towards the dispensing outlet, wherein the chute surface will hold the insert in place within the cassette during said travel. When the decoy has been dispensed from the vehicle, the air flow will flow through the orifice of the cassette's base portion, thereby exerting a pressure on the front side of the insert and will press the insert away from the cassette. When the insert has been separated from the cassette, the drag chute will be exposed to the air flow and thereby ripping the envelope from the pay load. The pay load is now clear to be activated according to known technique disturbing the incoming weapon threatening the vehicle. The orifice thereby ensures that the insert comprising the pay load will be separated from the cassette properly and quick.

The chute surface is preferably slanting back wards relative the air flow, whereby the separation of the insert from the cassette will be done even more easily and promptly. This is due to the fact that the air flow now will press the insert, during it's sliding on the slanting chute surface, further sideways from the vehicle ensuring that a greater pressure of the air flow will be exerted onto the insert's front side. A complementary force is thus achieved for feeding the insert from the air craft.

Suitably, the base portion comprises two orifices formed by the peripheral supporting portion and a rib.

Thereby the cassette will be even more rigid and less material has to be used for its structure and the rib will hold the parachute in place within the loaded decoy.

Preferably, the cassette is made of plastic.

BRIEF DESCRIPTION OF THE DRAWINGS

The present invention will now be described by way of examples with reference to the accompanying schematic drawings, of which schematically:

FIGS. 1a-1d illustrate a cassette according to an embodiment,

FIG. 1e illustrates a cassette according to another embodiment,

FIG. 2 illustrates a portion of a stack of to each other coupled cassettes,

FIG. 3 illustrates a separation procedure between a cassette and a pay load such as a chaff, FIG. 4 illustrates the cassette in FIG. 3 more in detail, FIG. 5 illustrates the cassettes in FIG. 3 in an frontal view.

DETAILED DESCRIPTION

Figure 6A:
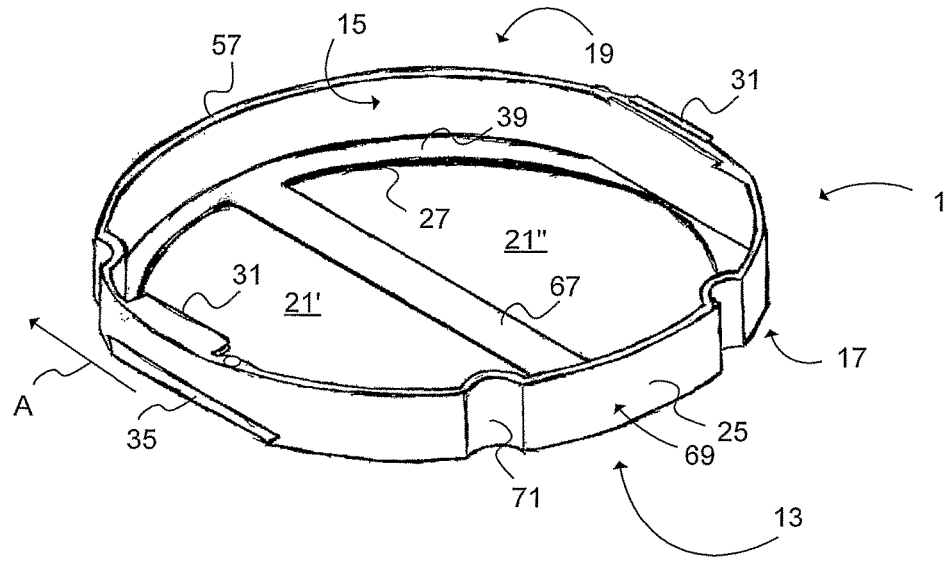
FIGS. 6a-6b illustrate a cassette in perspective and in an elevated view.

Hereinafter, embodiments of the present invention will be described in detail with reference to the accompanying drawings, wherein for sake of clarity and understanding of the invention some details of no importance are deleted from the drawings.

FIGS. 1a-1d schematically illustrate a cassette 1 being designed for accommodating a chaff (reference 3 in FIG. 2). The chaff 3 (or pyrophoric material) is enveloped within an envelope 5 (shown in FIGS. 3 and 4) in vacuum. The envelope 5 is connected to a parachute (reference 7 in FIGS. 3 and 4). The enveloped chaff 3 and the parachute 7 constitute a so called insert 9 (see FIG. 3). The parachute 7 is used to rip of the envelope 5 from the chaff 3, when the insert 9 (and the parachute 7) is exposed to an air flow AF (see FIG. 3) after being dispensed from a vehicle, here an aircraft 11. For example pyrophoric infrared decoys (CIV-IR) are used to avoid an incoming infrared seeking missile (not shown).

The cassette 1 being thus exposed to the air flow AF when dispensed from the air craft 11 in motion. The cassette 1 comprises a base portion 13 and a peripheral supporting portion 15. These portions 13, 15 are made of the same material, in this example being made of plastic, and are connected to each other via a corner portion 17. Said portions 13, 15 form a space for said accommodation of the chaff 3 and the parachute 7. An opening 19 is arranged in the cassette 1 opposite the base portion 13 through which opening 19 the chaff 3 can exit. The base portion 13 comprises an orifice 21 through which the air flow AF will flow pressing against and separating the chaff 3 from the cassette 1 when the cassette 1 is dispensed from the air craft 1 and meets the air flow AF. In this way the chaff 3 of the insert 9 easily and promptly will leave the cassette 1 after the discharge of the cassette 1 from a dispenser unit 23 (see FIG. 3) of the air craft 11. The chaff 3 is fully encompassed by the cassette 1, wherein the peripheral supporting portion 15 being comprised of a circular side wall 25 extending perpendicular from the base portion 13 such that it at least covers the thickness of the chaff 3. The base portion 13 is exposed to the air flow AF initially after the discharge of the cassette 1, wherein the opening 19 of the cassette 1 is not exposed to the air flow AF. This is achieved by that the cassette 1 is dispensed from the air craft 11 essentially perpendicular to the air flow AF direction, with the cassette's base portion 13 directed in the flying direction FD (see FIG. 3).

FIG. 1a shows the cassette 1 from the underside, wherein the base portion 13 is designed in the form of a circular flange 27 onto which the insert 9 can rest. The circular flange 27 forms the orifice 21. The peripheral supporting portion 15 is designed in the form of the side wall 25. The upper side 29 of the side wall 25 comprises two opposite first coupling members (hooks 31) (marked with dashed lines) arranged adjacent the opening 19 for coupling the cassette 1 with another cassette forming a stack 33 (see FIG. 2). The hooks 31 have a straight extension parallel with the plane of the base portion 13, so that the cassette 1 during the discharge is fed perpendicular to longitudinal direction of the stack 33.

That is, the extensions of the hooks 31 are parallel with each other and the hooks 31 are arranged tangential on the side wall's 25 upper side 29.

FIG. 1b shows the profile of the hooks 31 and also two longitudinal recesses 35 arranged in the circular flange 27 opposite the hooks 31. The recesses 35 are adapted for co-operation with the hooks 31 of the front coupled identical cassette 1' (see FIG. 2). The hooks 31 and the recesses 35 are thus arranged for releasable attachment to a subsequent coupled identical cassette 1 and/or in front coupled identical cassette 1, for forming the stack 33 of cassettes 1. Thereby a set of cassettes 1 can be hold together in the stack 33, which stack 33 can be loaded in a magazine 37 (see FIG. 3) connectable to the dispenser unit 23. The magazine 37 is in itself releasable coupled to the dispenser unit 23 of the air craft 11, such that easy mounting/replacement of a loaded magazine 37 can be achieved. The stack 33 provides for an easy loading of the magazine 37.

FIG. 1c shows the cassette 1 from above. The hooks 31 are clearly shown from above and also a supporting surface 39 of the circular flange 27 facing the inserted insert 9 (not shown). In FIG. 1d the cassette 1 is shown in a side view. The hooks 31 and the recesses 35 are designed as snap holders, so that several identical cassettes 1 can be coupled together forming the stack 33, and so that the cassette 1 during the discharge is fed perpendicular to longitudinal direction of the stack 33. In such a way the cassette 1 will leave the stack 33 after the discharge from the air craft 11 with no spinning, which is beneficially for a simple and quick separation of the chaff 3 and the cassette 1. This will also promote the possibility to arrange the magazine 37 within a fuselage 41 of the air craft 11 wherein the longitudinal axis 43 (see FIG. 3) of the inserted stack 33 (in the magazine 37) is essentially parallel with the extension of the fuselage 41 (still achieving that the chaffs 3 can be dispensed perpendicular to the flying direction FD without any spinning) which means a not bulky arrangement of the magazine 37 within the air craft's 11 shell.

FIG. 1e shows a further embodiment of an oval cassette 1 having four orifices 21', 21'', 21''', 21'''', two of which are circular and two are triangular. In this case coupling members 45 have an extension parallel with the extension of the ovality of the cassette 1. A longer extension of the coupling members 45 is thus achieved acting for a proper controlled exit of the cassette 1 from the stack 33 perpendicular to the flying direction FD. The orifices 21', 21'', 21''', 21'''' are designed such that the air flow AF will flow through the base portion 13, thereby pressing against and separating the chaff 3 from the cassette 1 when the cassette 1 is dispensed from a vehicle (not shown), i.e when the cassette 1 meets the air flow AF. In this way the chaff 3 of the insert 9 easily and promptly will leave the cassette 1 after the discharge of the cassette 1. The coupling members 45 are designed as longitudinal pins to be placed in corresponding channels of an adjacent cassette 1 (not shown).

FIG. 2 shows a portion of a stack 33, wherein two cassettes 1, 1' are coupled together via the hooks 31 and recesses 35. The insert 9 rests against the supporting surface 39 of the circular flange 27 and also against the underside 47 of the next cassette's 1 circular flange 27. Two projections 49 are arranged onto the upper side 29 of the side wall 25 adjacent the respective hook 31 (i.e onto a first axial surface of the cassette 1). The projections 49 co-operates with notches 51 of the under side 47 (a second axial surface) of the base portion 13 of the subsequent coupled identical cassette 1, achieving that a predetermined contact force must be overcome for disengaging the cassettes 1, 1' from each other. Thereby the cassette/cassettes 1 being prevented from unintentionally leaving the stack 33 due to vibrations. The cassette 1 will thereby not migrate from the magazine 37 and the dispenser unit 23 by mistake. A rib 67 divides the base portion into two orifices 21' and 21''.

FIG. 3 schematically shows cassettes 1 coupled into a stack 33 being inserted in a magazine 37. The magazine 37 is mounted to the dispenser unit 23 arranged within the fuselage 41 of a civil air craft 11. The air flow is indicated with arrow AF and the flying direction is marked with arrow FD. A plunger 53 of the dispenser 23 unit acts for pushing each cassette 1 comprising the chaff 3 (so called decoy 55 in FIG. 3). When the decoy 55 leaves the air craft 11, the base portion 13 is exposed to the air flow AF. The air flow AF will flow through the orifice 21 and will push the insert 9 away from the cassette 1. The parachute 7 of the insert 9 will be exposed to the air flow AF and will rip of the envelope 5 of the chaff 3, thus being activated at 3'.

The function of the cassette 1 is further explained in FIG. 4. It is shown that the upper side 29 of the cassette's 1 peripheral supporting portion 15 comprises a sliding surface 57 arranged adjacent the opening 19. The sliding surface 57 is parallel with the extension of the chaff 3 in plane and is evenly formed around the opening 19 in such way that the cassette 1 can slide over an adjacent cassette's 1 under side 47 when being pushed from the stack 33 by the plunger 53 and in such way that the cassette 1 can slide further over a chute 59. The chute 59 is arranged for feeding the cassettes 1 from the magazine 37 to the exterior of the air craft 11, i.e to the air flow AF. Each decoy 55 includes a cassette 1 comprising the insert 9, wherein each insert 9 comprises said chaff 3 enveloped in the envelope 5 being connected to the parachute 7. The insert 9 has a front side 61, being formed on base portion 13 of the cassette 1 and being exposed to the airflow AF when being separated from the cassette 1. A rear side 63 of the insert 9 is opposite and facing away from the front side 61. The chute 59 of the dispenser unit 23 is oriented slanting back wards (slanting chute surface 65) relative the air flow AF. In FIG. 3 the chute 59 is essentially arranged perpendicular to the axial extension of the magazine and the stack. By means of the slanting chute surface 65 the separation of the insert 9 from the cassette 1 will be done even more easily and promptly. This is due to the fact that the air flow AF now will press the cassette 1, when the upper side 29 of the peripheral supporting portion 15 slides on the slanting chute surface 65, further sideways from the air craft 11 ensuring that a greater pressure of the air flow AF will be exerted onto the insert's 9 front side 61. A complementary force is thus achieved for feeding the insert 9 from the air craft 11. The sliding surface 57 of the cassette 1 in contact with the slanting chute surface 65 will thus provide for that the air flow AF propels the cassette 1 away from the air craft 11.

The flight direction FD of the air craft 11 essentially coincides with the axial direction of the magazine 37, wherein the decoys 55 will be fed in the chute 59 in a direction essentially transverse the direction of travel. Since the insert 9, being encompassed in the cassette 1, has to be separated from the cassette 1 through the opening 19, the opening 19 is directed towards the chute surface 65 (or 59 in FIG. 3) and in a direction opposite the flight direction FD. The rear side 63 of the insert 9 faces the chute surface 65 during the cassette's 1 motion from the magazine 37 towards the dispensing outlet E, wherein the chute surface 65 will hold the insert 9 in place within the cassette 1 during said motion. The sliding surface 57 of the cassette 1 will slide over the chute surface 65. When the decoy 55 has been dispensed from the air craft 11, the air flow AF will flow through the orifice 21 of the cassette's 11 base portion 13, thereby exerting a pressure on the front side 61 of the insert 9 and will press the insert 9 away from the cassette 1. When the insert 9 has been separated from the cassette 1, the drag chute 7 will be exposed to the air flow AF and thereby ripping of the envelope 5 from the chaff 3. The chaff 3 is now clear to be activated (marked with 3') according to known technique disturbing the incoming weapon threatening the vehicle. The orifice 21 thereby ensures that the insert 9 comprising the chaff 3 will be separated from the cassette 1 properly and quickly.

In FIG. 4 the chute surface 65 is preferably slanting back wards relative the air flow AF, whereby the separation of the insert 9 from the cassette 1 will be done even more easily and promptly. This is due to the fact that the air flow AF will press the cassette 1, when the cassette's 1 sliding surface 57 is sliding on the slanting chute surface 65, further sideways from the air craft 11 ensuring that a greater pressure of the air flow AF will be exerted onto the insert's 9 front side 61. A complementary force is thus achieved for feeding the insert 9 from the air craft 11. The cassette 1 comprises the base portion 13 arranged with the orifice 21 for inlet of air flow AF. The air flow AF being conducted through the orifice 21 pushes the insert 9 away from the cassette 1. The base portion 13 also serves as a support for supporting the insert 9 in the stack 33. The base portion comprises also a sliding surface 57/supporting portion 39 (which also acts as a housing for accommodating the insert 3) for sliding over an adjacent cassette 1. By this design of the cassette, the cassette 1 effective can store the chaff 3 in a magazine 37 and is also easy to separate from the chaff 3 when dispensed. The cassettes 1 are coupled together in the magazine 37 and are fed by a spring 62 towards the dispenser unit 23.

The largest surface, i.e the base portion's 13 surface 47 and the major part of the front side 61 of the insert 9 will face the air flow AF immediately after the ejection of the decoy 55 from the dispenser unit 23 when it leaves the air craft 11. The free side of the decoy 55 (i.e. the side having the opening 19) is not exposed to the air flow AF in order to facilitate the separation between the insert 9, comprising the chaff 3, and the cassette 1.

FIG. 5 shows a civil air craft 11 from the front. Cassettes 1 comprising chaffs 3 are dispensed from the interior of the fuselage 41 to the air flow, wherein the cassette's 1 base portion 13 are exposed to the air flow AF. The cassettes 1 are dispensed from the air craft 11 by means of a dispenser unit 23 mounted in the air craft 11. The dispenser unit 23 is connectable to the replaceable magazine (reference 37 in FIG. 4). The replaceable magazine 37 is arranged for storing a plurality of decoys 55. Each decoy 55 comprises the cassette 1 accommodating the chaff 3 enveloped within the envelope 5. The enveloped chaff 3 is connected to the parachute 7. The enveloped chaff 3 and the parachute 7 constitute the so called insert 9. The parachute 7 is used to rip of the envelope 5 from the chaff 3 when the insert 9 (and thereby the parachute 7) is exposed to the air flow AF after being dispensed from the air craft 11. The dispenser unit 23 is adapted to dispense for example pyrophoric infrared decoys (CIV-IR) to avoid an incoming infrared seeking missile being detected.

FIG. 6a shows a cassette 1 in perspective according to a further embodiment. The cassette 1 comprises a circular flange 27 constituting the base portion 13. A rib 67 extends diametrically between two opposite sides of the circular flange 27. The rib divides the base portion 13 in two orifices 21', 21". The corner portion 17 joins the circular flange 27 and the peripheral supporting portion 15. The peripheral supporting portion 15 (side wall 25) comprises the sliding surface 57 and two hooks 31 for snap connection to another cassette. The corner portion 17 comprises two recesses 35 opposite the hooks 31 for said snap connection with the hooks 31. The peripheral supporting portion 15 comprises an outer surface 69 (mantle), around which asymmetric disposed first fitting means 71 (grooves extending parallel with axis 43) are arranged such that the cassette 1 only can be mounted in one way in the magazine 37 (see FIG. 4). The magazine's 37 inner surface (not shown) comprises corresponding second fitting means (parallel with the axis 43 extending bulges). Thereby the cassettes 1 forming a stack 33 only can be mounted in the magazine 37 in one way, wherein the two orifice 21', 21" of each cassette 1 will be directed towards the air flow AF when the cassette 1 leaves the air craft 11. This will promote that the chaff 3 quick and easy will separate from the cassette 1 after the discharge of the cassette 1 from the air craft 11.

Figure 6B:
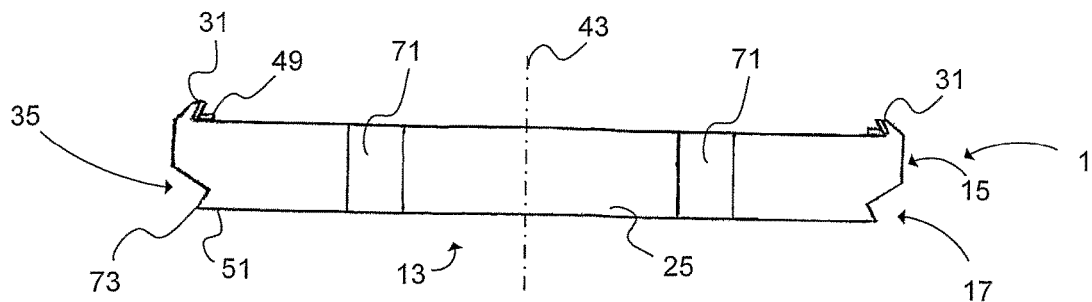

FIG. 6b shows the cassette 1 in FIG. 6a in a side view. The recesses 35 are formed in the corner portions 17 so that acute portions 73 are achieved. Each hook 31 has a profile with an angular form corresponding with the shape of the corresponding recess 35 for providing a snap in coupling between the two cassettes 1, wherein the cassettes 1 can be separated from each other in a sliding manner and perpendicular to the axis 43 and in direction according to arrow A (see FIG. 6a). By this coupling arrangement the cassette a can be mounted in a stack The present invention is of course not in any way restricted to the preferred embodiments described above, but many possibilities to modifications, or combinations of the described embodiments thereof, should be apparent to a person with ordinary skill in the art without departing from the basic idea of the invention as defined in the appended claims. For example, other forms of the cassette than circular and oval exist, such as square cassettes wherein one side wall surface acts as a guiding surface in contact with the chute surface of the dispenser unit.

The invention claimed is:

1. A cassette for accommodating a payload, the cassette being exposed to an air flow when dispensed from a vehicle in motion, the cassette comprising:
   a base portion;
   a peripheral supporting portion connected to the base portion, wherein the base portion and the peripheral supporting portion form a space for accommodating the payload;
   an opening arranged in the cassette opposite the base portion, wherein the payload can exit through the opening, the base portion comprises
   at least one orifice in the base portion, wherein the air flow will flow through the at least one orifice pressing against and separating the payload from the cassette when the cassette and payload are dispensed from the vehicle,
   two opposite first coupling members arranged on the peripheral supporting portion adjacent the opening; and
   two opposite second coupling members arranged on the base portion, wherein the first coupling members and the second coupling members are configured to releasably attach the cassette to a subsequent coupled identical cassette and/or in front coupled identical cassette to form a stack of cassettes, wherein the first coupling members and second coupling members are snap holders, wherein each of the first coupling members comprises a hook having a straight extension parallel with a plane of the base portion, wherein the straight extension of the two opposite hooks are parallel with each other, such that during the discharge the first coupling member and the second coupling member slide laterally past each other, thereby permitting the cassette to be fed perpendicular to a longitudinal direction of the stack.

2. The cassette according to claim 1, further comprising:
at least a projection arranged on a first axial surface of the cassette adjacent the first coupling members, wherein the at least one projection cooperates with a second axial surface of a subsequent coupled identical cassette and/or in front coupled identical cassette such that a predetermined contact force must be overcome for disengaging the cassettes from each other.

3. The cassette according to claim 1, further comprising:
an asymmetrically disposed first fitting arranged on an outer surface of the peripheral supporting portion, thereby permitting the cassette to be mounted in only one way in a magazine comprising a corresponding second fitting.

4. The cassette according to claim 1, wherein the peripheral supporting portion comprises a sliding surface arranged adjacent the opening, which sliding surface is parallel with the extension of the payload.

5. The cassette according to claim 1, wherein the base portion comprises two orifices formed by the peripheral supporting portion and a rib.

6. The cassette according to claim 1, wherein the cassette is made of plastic.

* * * * *